United States Patent
Inoue et al.

(10) Patent No.: US 10,919,569 B2
(45) Date of Patent: Feb. 16, 2021

(54) VEHICLE CONTROL SYSTEM

(71) Applicant: TOYOTA JIDOSHA KABUSHIKI KAISHA, Toyota (JP)

(72) Inventors: Go Inoue, Gotemba (JP); Masaki Shiota, Sunto-gun (JP); Hirotaka Tokoro, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 16/504,429

(22) Filed: Jul. 8, 2019

(65) Prior Publication Data
US 2020/0070875 A1 Mar. 5, 2020

(30) Foreign Application Priority Data
Sep. 4, 2018 (JP) .............................. JP2018-165260

(51) Int. Cl.
*B62D 6/00* (2006.01)
*B62D 6/04* (2006.01)

(52) U.S. Cl.
CPC . *B62D 6/00* (2013.01); *B62D 6/04* (2013.01)

(58) Field of Classification Search
USPC .................................. 701/23–28, 36, 41–43
See application file for complete search history.

(56) References Cited

U.S. PATENT DOCUMENTS

| | | | | | |
|---|---|---|---|---|---|
| 4,790,402 | A | * | 12/1988 | Field | G05D 1/0238 180/169 |
| 4,846,297 | A | * | 7/1989 | Field | G01S 17/931 180/169 |
| 9,567,004 | B1 | * | 2/2017 | Jhang | B62D 15/025 |
| 9,630,621 | B2 | * | 4/2017 | Kurata | B60W 50/085 |
| 10,589,785 | B2 | * | 3/2020 | Kim | G08G 1/167 |
| 2009/0299573 | A1 | * | 12/2009 | Thrun | B62D 15/025 701/41 |
| 2010/0106356 | A1 | * | 4/2010 | Trepagnier | G08G 1/16 701/25 |
| 2012/0035788 | A1 | * | 2/2012 | Trepagnier | B60W 10/20 701/3 |

(Continued)

FOREIGN PATENT DOCUMENTS

JP 2017-027292 A 2/2017
JP 2018-039369 A 3/2018

*Primary Examiner* — Jonathan L Sample
(74) *Attorney, Agent, or Firm* — Sughrue Mion, PLLC

(57) ABSTRACT

A vehicle control system installed on a vehicle executes turning control that controls a turning device configured to turn a wheel of the vehicle. The turning control includes: first turning control that generates a target trajectory and makes the vehicle follow the target trajectory; and second turning control that is executed independently of the first turning control without depending on the target trajectory. When the first turning control and the second turning control are executed simultaneously, the vehicle control system determines whether the first turning control counteracts turning by the second turning control. When the first turning control counteracts the turning by the second turning control, the vehicle control system replans the target trajectory by designating at least one of a current position and a current yaw angle of the vehicle as a starting point of the target trajectory.

4 Claims, 12 Drawing Sheets

(56) References Cited

U.S. PATENT DOCUMENTS

| | | | |
|---|---|---|---|
| 2015/0134204 A1* | 5/2015 | Kunihiro | B60W 40/112 701/41 |
| 2016/0059856 A1* | 3/2016 | Van Dan Elzen | B60W 30/16 701/42 |
| 2017/0008521 A1* | 1/2017 | Braunstein | G01C 21/3492 |
| 2017/0021829 A1* | 1/2017 | Nishimura | B60W 10/18 |
| 2017/0043780 A1* | 2/2017 | Yoon | B60W 10/04 |
| 2017/0144701 A1* | 5/2017 | Medagoda | B62D 15/025 |
| 2018/0011489 A1* | 1/2018 | Oba | B62D 15/025 |
| 2018/0024562 A1* | 1/2018 | Bellaiche | G06T 7/73 701/26 |
| 2018/0024568 A1* | 1/2018 | Fridman | G06K 9/00791 701/28 |

\* cited by examiner

VEHICLE CONTROL SYSTEM

BACKGROUND

Technical Field

The present disclosure relates to a vehicle control system installed on a vehicle. In particular, the present disclosure relates to a vehicle control system executing turning control that controls turning of a wheel of a vehicle.

Background Art

Patent Literature 1 discloses a vehicle travel control method that controls a vehicle to follow a target trajectory. The method detects a vehicle body azimuth of the vehicle, measures a lateral deviation amount of an actual travel trajectory from the target trajectory, and stores the detected vehicle body azimuth and the lateral deviation amount to be associated with each other. The next time of travel, the target trajectory is corrected based on the vehicle body azimuth and the lateral deviation amount that are stored.

Patent Literature 2 discloses a vehicle control device that executes vehicle control for avoiding collision between a vehicle and an object. The vehicle control device detects an object around the vehicle, and determines whether or not the vehicle has potential of colliding with the detected object. When it is not possible to avoid the collision only by braking control, the vehicle control device further executes steering control for avoiding the collision.

LIST OF RELATED ART

Patent Literature 1: Japanese Unexamined Patent Application Publication No. JP-2018-039369
Patent Literature 2: Japanese Unexamined Patent Application Publication No. JP-2017-027292

SUMMARY

"Trajectory-following control (path-following control)" that controls vehicle travel such that a vehicle follows a target trajectory (target path) is known. The trajectory-following control includes turning control (first turning control) that turns a wheel so as to make the vehicle follow the target trajectory. Let us consider a case where another turning control (second turning control) independent of the trajectory-following control is executed simultaneously with the first turning control. In this case, the first turning control by the trajectory-following control and the second turning control independent of the trajectory-following control may interfere with each other. In particular, when the first turning control acts to counteract (impede, cancel) the turning by the second turning control, an effect of the second turning control is reduced, that is, performance of the second turning control cannot be achieved as expected.

An object of the present disclosure is to provide a technique that can appropriately execute the second turning control when the second turning control is executed simultaneously with the first turning control that makes the vehicle follow the target trajectory.

A first aspect provides a vehicle control system installed on a vehicle.
The vehicle control system includes:
a turning device configured to turn a wheel of the vehicle; and
a control device configured to execute turning control that controls the turning device.

The turning control includes:
first turning control that generates a target trajectory and makes the vehicle follow the target trajectory; and
second turning control that is executed independently of the first turning control without depending on the target trajectory.

When the first turning control and the second turning control are executed simultaneously, the control device determines whether or not the first turning control counteracts turning of the wheel by the second turning control.

When determining that the first turning control counteracts the turning of the wheel by the second turning control, the control device replans the target trajectory by designating at least one of a current position and a current yaw angle of the vehicle as a starting point of the target trajectory.

A second aspect further has the following feature in addition to the first aspect.
when determining that the first turning control strengthens the turning of the wheel by the second turning control, the control device maintains the target trajectory without replanning.

A third aspect further has the following feature in addition to the first or second aspect.
The control device compares a first target turning direction of the first turning control and a second target turning direction of the second turning control.

When the first target turning direction is opposite to the second target turning direction, the control device determines that the first turning control counteracts the turning of the wheel by the second turning control.

A fourth aspect further has the following feature in addition to any one of the first to third aspects.
Priority of the second turning control is higher than priority of the first turning control.

According to the present disclosure, when the first turning control and the second turning control are executed simultaneously, the vehicle control system determines whether or not the first turning control counteracts the turning by the second turning control. When determining that the first turning control counteracts the turning by the second turning control, the vehicle control system replans the target trajectory by designating at least one of the current position and the current yaw angle of the vehicle as the starting point of the target trajectory. Such the replanning processing makes it possible to suppress a turning amount due to the first turning control that makes the vehicle follow the target trajectory. As a result, influence of the first turning control on the second turning control is suppressed and thus the second turning control is executed appropriately. That is, desired performance can be achieved regarding the second turning control.

Moreover, the first turning control is not terminated, even when the first turning control counteracts the turning by the second turning control. Instead of terminating the first turning control, the vehicle control system replans the target trajectory to continue the first turning control. Therefore, even after the second turning control ends, the first turning control continues and a trajectory-following effect due to the first turning control is continuously obtained.

EMBODIMENTS

Embodiments of the present disclosure will be described below with reference to the attached drawings.

1. Outline

Figure 1:
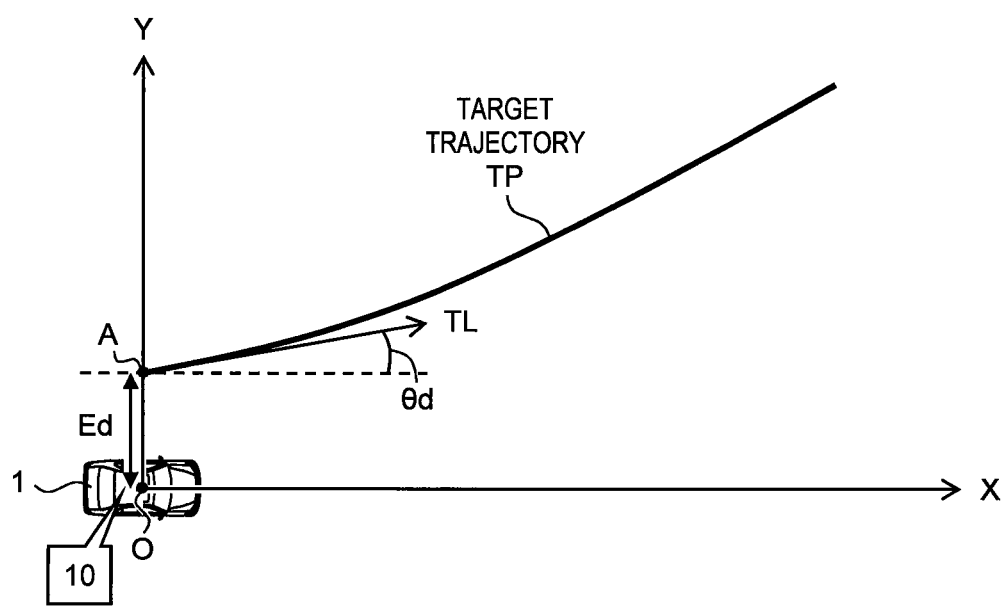
FIG. 1 is a conceptual diagram for explaining trajectory-following control by a vehicle control system according to an embodiment of the present disclosure.

FIG. 1 is a conceptual diagram for explaining trajectory-following control by a vehicle control system 10 according to an embodiment of the present disclosure. The vehicle control system 10 is installed on a vehicle 1 and executes vehicle travel control that controls travel of the vehicle 1. The vehicle control system 10 may be an automated driving system that controls automated driving of the vehicle 1.

The trajectory-following control is a kind of the vehicle travel control. In the trajectory-following control, the vehicle control system 10 generates a target trajectory (target path) TP for the vehicle 1 and controls travel of the vehicle 1 such that the vehicle 1 follows the target trajectory TP.

Here, let us define a coordinate system (X, Y). In the example shown in FIG. 1, an origin O is located at a center of the vehicle 1. An X-direction is a forward direction of the vehicle 1, and a Y-direction is a planar direction orthogonal to the X-direction. However, the coordinate system (X, Y) is not limited to the example shown in FIG. 1.

The target trajectory TP is defined in the coordinate system (X, Y) at a certain timing. Let us consider a point A on the target trajectory TP that is located in the Y-direction from the origin O. A lateral deviation Ed is a distance between the origin O and the point A, that is, a distance between the vehicle 1 and the target trajectory TP. A yaw angle deviation (azimuth angle deviation) θd is an angle between a tangent line TL to the target trajectory TP at the point A and the forward direction of the vehicle 1.

The vehicle control system 10 calculates the lateral deviation Ed and the yaw angle deviation θd between the vehicle 1 and the target trajectory TP, based on information of a position and an orientation (azimuth) of the vehicle 1 and the target trajectory TP. Then, based on the lateral deviation Ed and the yaw angle deviation θd, the vehicle control system 10 controls the travel of the vehicle 1 such that the vehicle 1 follows the target trajectory TP. For example, the vehicle control system 10 controls the travel of the vehicle 1 such that the lateral deviation Ed and the yaw angle deviation θd decrease.

Figure 2:
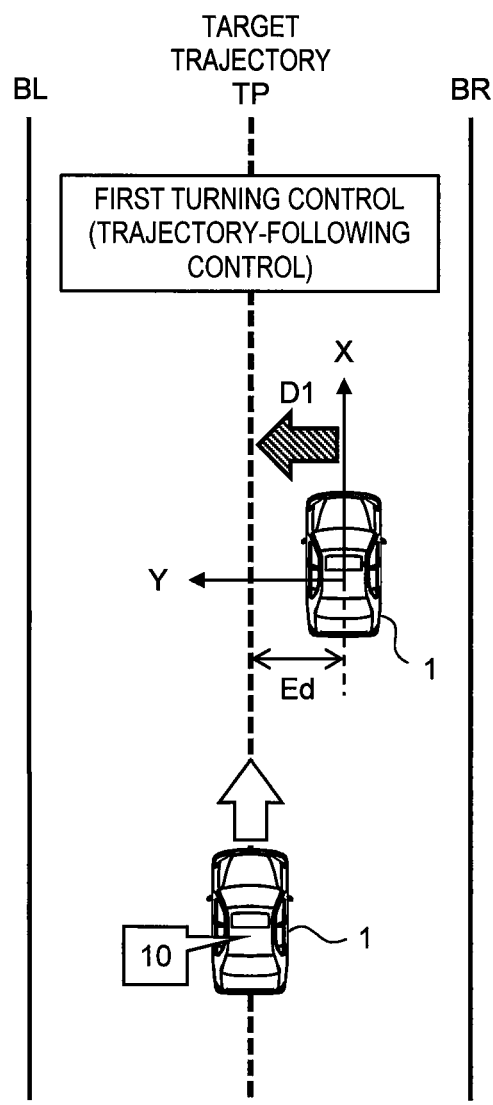
FIG. 2 is a conceptual diagram for explaining turning control in the trajectory-following control by the vehicle control system according to the embodiment of the present disclosure.

FIG. 2 is a conceptual diagram for explaining turning control in the trajectory-following control. The trajectory-following control that makes the vehicle 1 follow the target trajectory TP includes turning control (steering control) that turns a wheel of the vehicle 1 and acceleration/deceleration control that accelerates/decelerates the vehicle 1. For example, as shown in FIG. 2, when the vehicle 1 deviates from the target trajectory TP, the vehicle control system 10 executes the turning control in order to move the vehicle 1 closer to the target trajectory TP. Such the turning control due to the trajectory-following control, that is, the turning control for making the vehicle 1 follow the target trajectory TP is hereinafter referred to as "first turning control".

Furthermore, the vehicle control system 10 according to the present embodiment executes "second turning control" that is different from the first turning control due to the trajectory-following control. The second turning control is another turning control that is executed independently of the first turning control without depending on the target trajectory TP. The second turning control is exemplified by "collision avoidance control" that assists in avoiding collision between the vehicle 1 and an object, "lane departure prevention control" that assists in preventing the vehicle 1 from departing from a travel lane, and so forth. Priority of the second turning control such as the collision avoidance control and the lane departure prevention control is higher than priority of the first turning control.

Here, let us consider a case where the first turning control (i.e. the trajectory-following control) and the second turning control are executed simultaneously. In this case, the first turning control and the second turning control may interfere with each other. As the interference between the first turning control and the second turning control, there are both a case where the first turning control and the second turning control counteract each other and a case where the first turning control and the second turning control strengthen each other.

Figure 3:
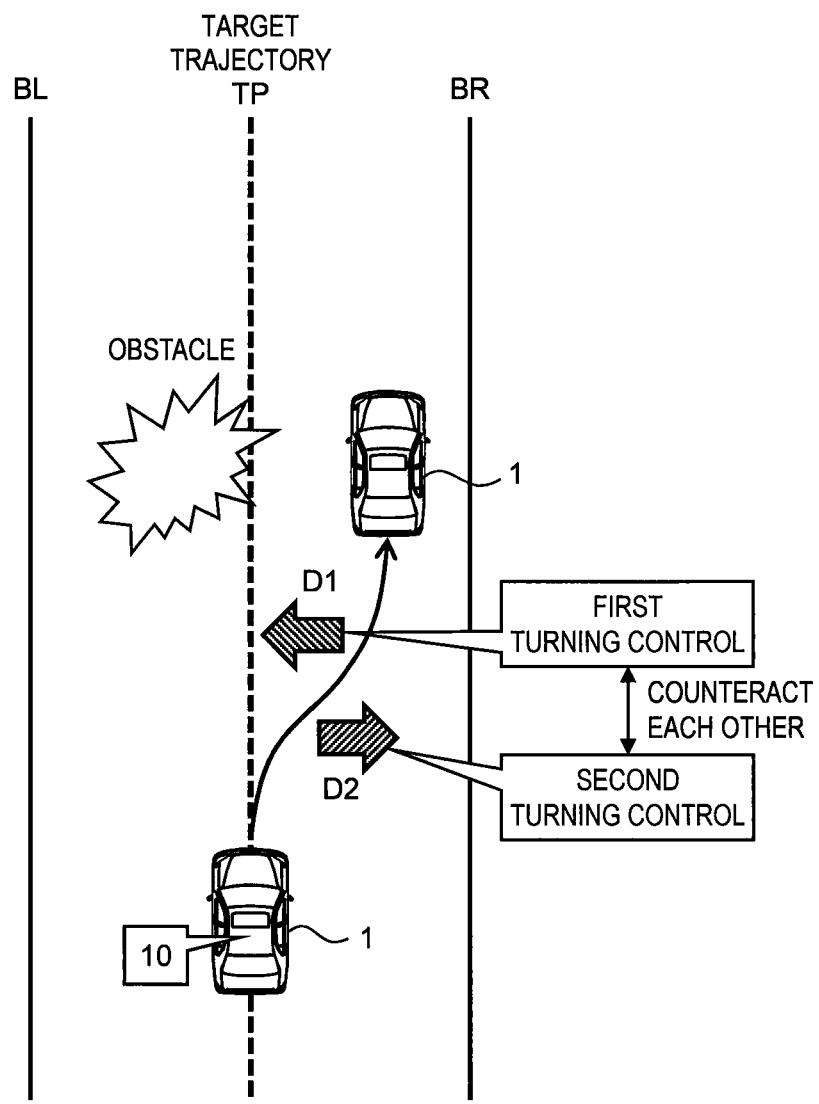
FIG. 3 is a conceptual diagram showing a case where first turning control and second turning control counteract each other, as an example of interference between the first turning control and the second turning control.

FIG. 3 shows the case where the first turning control and the second turning control counteract each other, as an example of the interference. In the example shown in FIG. 3, the second turning control is the collision avoidance control that assists in avoiding collision between the vehicle 1 and an object.

For example, as shown in FIG. 3, an obstacle exists in front of the vehicle 1 traveling on the target trajectory TP. When recognizing the obstacle, the vehicle control system 10 determines whether or not the vehicle 1 will collide with the obstacle. When determining that the vehicle 1 will collide with the obstacle, the vehicle control system 10 executes the second turning control in order to avoid the obstacle. More specifically, the vehicle control system 10 executes the second turning control such that the vehicle 1 moves towards a lane boundary BR. A target turning direction (hereinafter referred to as a "second target turning direction D2") of the second turning control is a direction from the target trajectory TP towards the lane boundary BR.

When the vehicle 1 moves towards the lane boundary BR due to the second turning control, the vehicle 1 deviates from the target trajectory TP. When the vehicle 1 deviates from the target trajectory TP, the vehicle control system 10 executes the first turning control in order to move the vehicle 1 closer to the target trajectory TP. A target turning direction (hereinafter referred to as a "first target turning direction D1") of the first turning control is a direction towards the target trajectory TP.

The first target turning direction D1 of the first turning control is opposite to the second target turning direction D2 of the second turning control. That is, the first turning control acts to counteract (impede, cancel) the turning by the second turning control. Therefore, an effect of the second turning control is reduced. In other words, performance of the second turning control cannot be achieved as expected. For example, vehicle behavior for avoiding the obstacle becomes sluggish. This is not preferable in terms of collision avoidance.

In view of the above, the present embodiment provides a technique that can appropriately execute the second turning control when the second turning control is executed simultaneously with the first turning control that makes the vehicle 1 follow the target trajectory TP.

Figure 4:
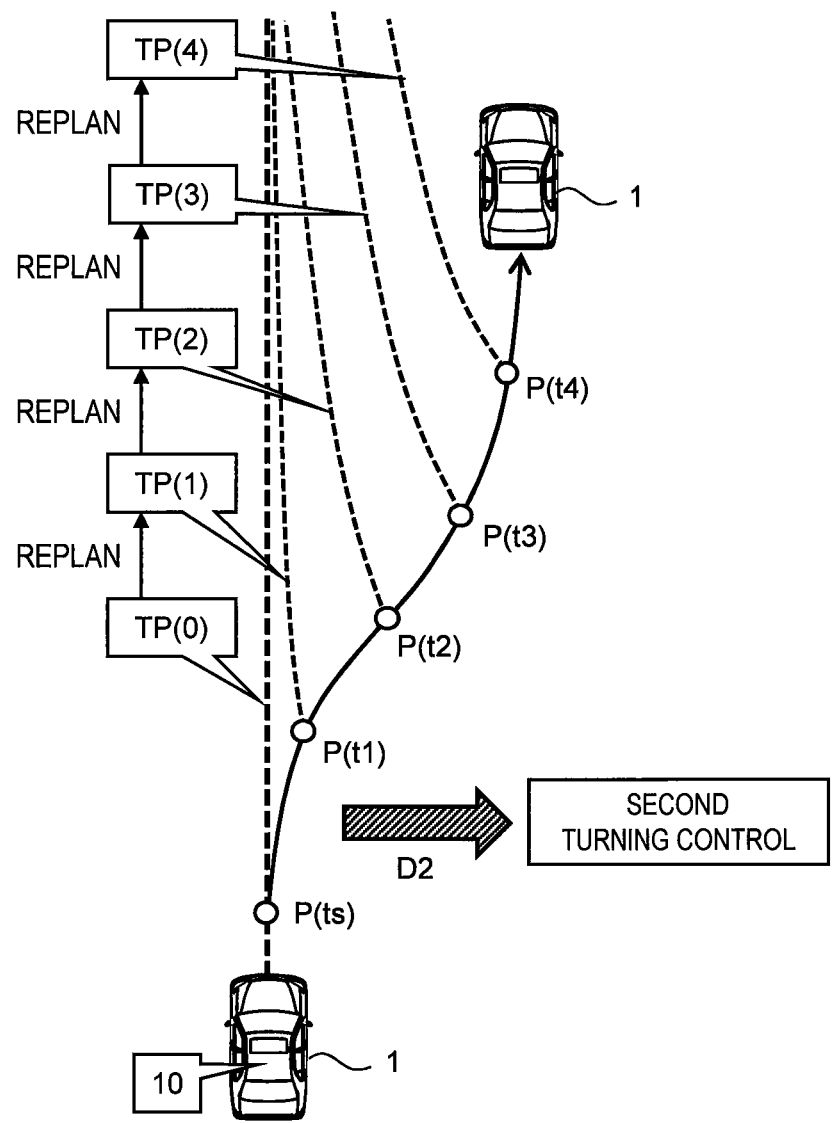
FIG. 4 is a conceptual diagram for explaining replanning of a target trajectory by the vehicle control system according to the present disclosure.

FIG. 4 is a conceptual diagram for explaining a feature of the present embodiment. Before a time ts, the vehicle control system 10 executes the trajectory-following control such that the vehicle 1 follows a target trajectory TP(0). At the time ts, the second turning control is started. The second target turning direction D2 of the second turning control is a direction away from the target trajectory TP(0).

At a time t1 after the time ts, the vehicle 1 is located at P(t1) and deviates from the target trajectory TP(0). The vehicle control system 10 determines that the first turning control making the vehicle 1 follow the target trajectory TP(0) counteracts the turning by the second turning control. In this case, the vehicle control system 10 replans (regenerates) the target trajectory TP by designating the current position P(t1) of the vehicle 1 as a starting point of the target trajectory TP. The starting point here means a starting position. The target trajectory TP is updated from the previous target trajectory TP(0) to a new target trajectory TP(1) whose starting point is the current position P(t1). Due to the replanning processing, the lateral deviation Ed is reset to zero. Therefore, a turning amount due to the first turning control is suppressed. As a result, influence of the first turning control on the second turning control is suppressed and thus the second turning control is executed appropriately.

The same applies thereafter. The vehicle control system 10 determines whether or not the first turning control counteracts the turning by the second turning control. Whenever it is determined that the first turning control counteracts the turning by the second turning control, the vehicle control system 10 executes the replanning processing to regenerate a target trajectory TP(k) whose starting point is a current position P(tk) of the vehicle 1.

For example, the vehicle control system 10 acquires information on a position and a travel state of the vehicle 1 every certain cycle. A timing of acquiring the information is a sampling timing. For each sampling timing, the vehicle control system 10 determines whether or not the first turning control counteracts the turning by the second turning control. As a result, it is possible to effectively suppress the influence of the first turning control on the second turning control.

Figure 5:
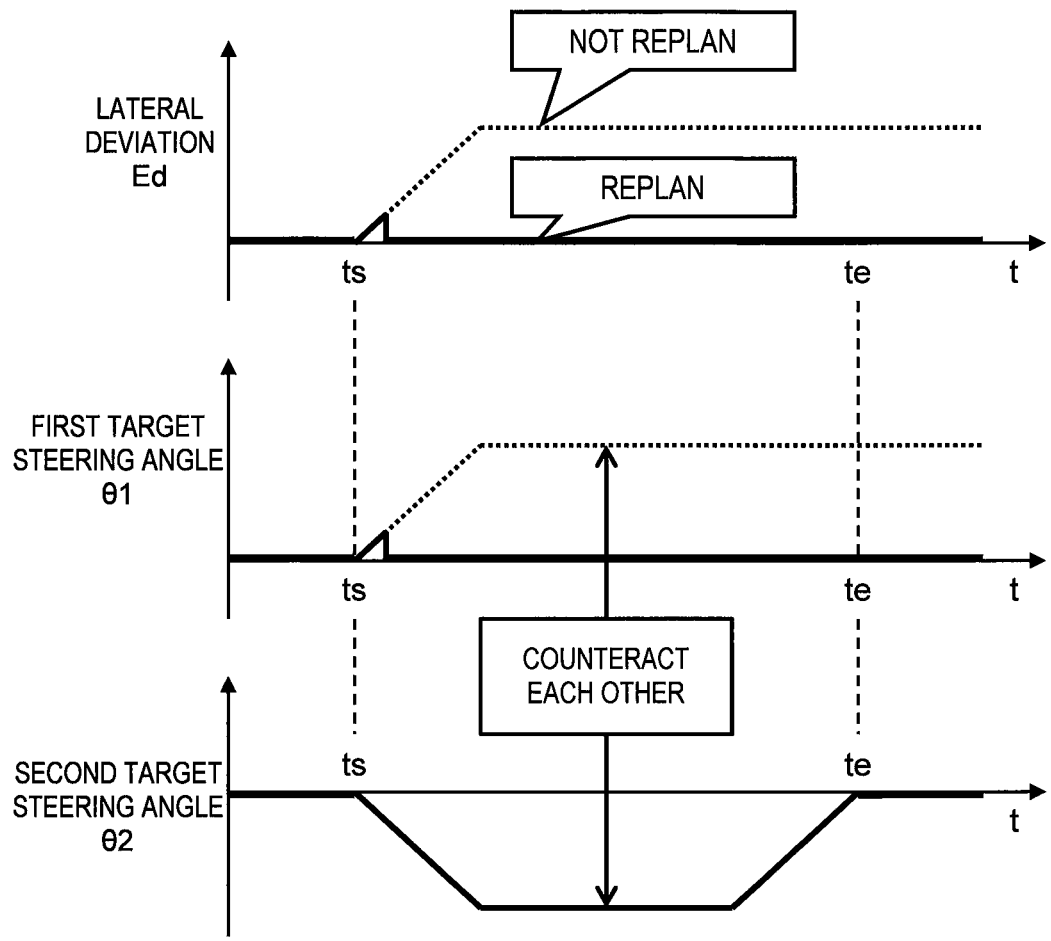
FIG. 5 is a timing chart for explaining the first turning control and the second turning control in the case of the example shown in FIG. 4.

FIG. 5 is a timing chart for explaining the first turning control and the second turning control in the case of the example shown in FIG. 4. Respective time variations of the lateral deviation Ed, a first target steering angle $\theta 1$, and a second target steering angle $\theta 2$ are shown in FIG. 5. The first target steering angle $\theta 1$ is a target steering angle required for the first turning control. The second target steering angle $\theta 2$ is a target steering angle required for the second turning control. A sign (positive/negative) of the target steering angle varies depending on the target turning direction. Difference in the sign between the first target steering angle $\theta 1$ and the second target steering angle $\theta 2$ means that the first target turning direction D1 and the second target turning direction D2 are opposite to each other.

At the time ts, the second turning control is started. At a time te, the second turning control ends. During a period from the time ts to the time te, the first turning control and the second turning control operates simultaneously. During that period, the vehicle control system 10 replans the target trajectory TP by designating the current position of the vehicle 1 as the starting point of the target trajectory TP. Due to the replanning processing, the lateral deviation Ed is reset to zero. Therefore, the first target steering angle $\theta 1$ required for the first turning control is suppressed. As a result, the influence of the first turning control on the second turning control is suppressed.

As a comparative example, a case where no replanning processing is executed also is shown by a dotted line in FIG. 5. In the case where no replanning processing is executed, the first turning control and the second turning control counteract each other, and thus desired turning performance cannot be achieved.

In the description above, the vehicle control system 10 replans the target trajectory TP by designating the current position of the vehicle 1 as the starting point of the target trajectory TP. As another example, the vehicle control system 10 may replan the target trajectory TP by designating a current yaw angle (azimuth, orientation) of the vehicle 1 as a starting point of the target trajectory TP. The starting point in this case means a starting yaw angle. Due to the replanning processing, the yaw angle deviation $\theta d$ is reset to zero. Therefore, similar effects can be obtained. Of course, it is also possible that the vehicle control system 10 replans the target trajectory TP by designating both the current position and the current yaw angle of the vehicle 1 as a starting point of the target trajectory TP.

As described above, when the first turning control and the second turning control are executed simultaneously, the vehicle control system 10 according to the present embodiment determines whether or not the first turning control counteracts the turning by the second turning control. When determining that the first turning control counteracts the turning by the second turning control, the vehicle control system 10 replans the target trajectory TP by designating at least one of the current position and the current yaw angle of the vehicle 1 as the starting point of the target trajectory TP. Such the replanning processing makes it possible to suppress the turning amount due to the first turning control that makes the vehicle 1 follow the target trajectory TP. As a result, the influence of the first turning control on the second turning control is suppressed and thus the second turning control is executed appropriately. That is, desired performance can be achieved regarding the second turning control.

Moreover, according to the present embodiment, the first turning control is not terminated, even when the first turning control counteracts the turning by the second turning control. Instead of terminating the first turning control, the vehicle control system 10 replans the target trajectory TP to continue the first turning control. Therefore, even after the second turning control ends, the first turning control continues and a trajectory-following effect due to the first turning control (i.e. the trajectory-following control) is continuously obtained.

Figure 6:
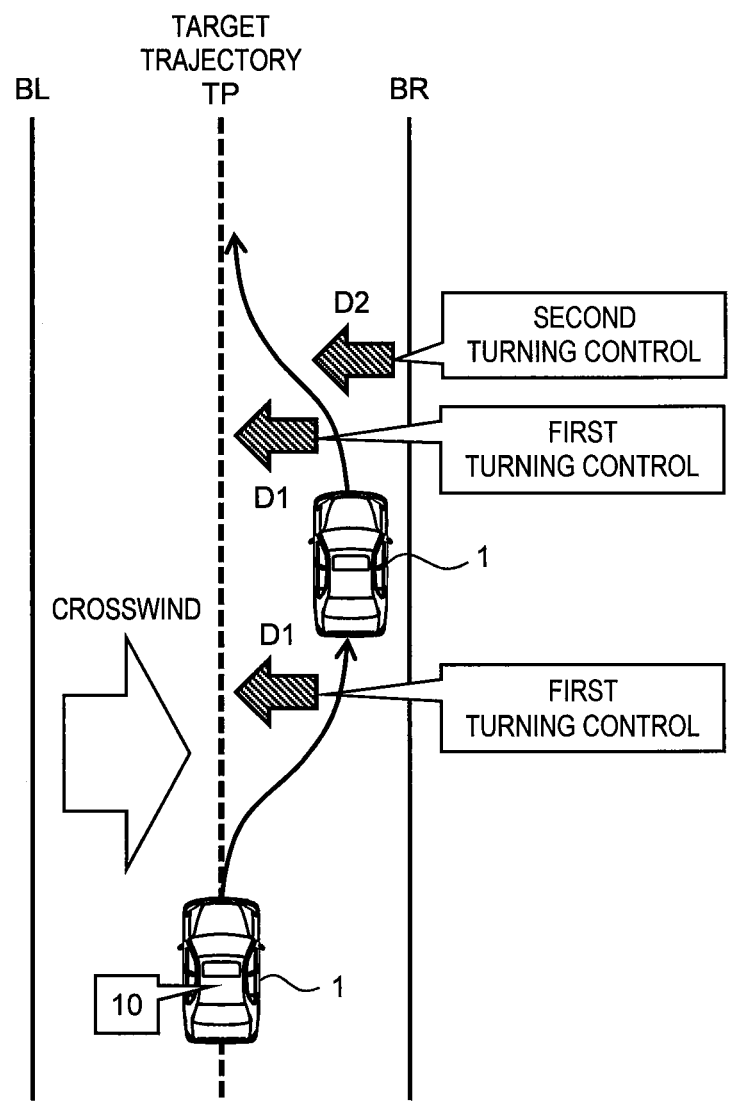
FIG. 6 is a conceptual diagram showing a case where the first turning control and the second turning control strengthen each other, as another example of interference between the first turning control and the second turning control.

FIG. 6 shows the case where the first turning control and the second turning control strengthen each other, as another example of the interference. In the example shown in FIG. 6, the second turning control is the lane departure prevention control that assists in preventing the vehicle 1 from departing from a travel lane.

For example, as shown in FIG. 6, a crosswind hits the vehicle 1 traveling on the target trajectory TP and the vehicle 1 is pushed towards a lane boundary BR. When the vehicle 1 deviates from the target trajectory TP, the vehicle control system 10 executes the first turning control in order to move the vehicle 1 closer to the target trajectory TP. The first target turning direction D1 of the first turning control is a direction towards the target trajectory TP.

Moreover, when detecting that the lane boundary BR is close to the vehicle 1, the vehicle control system 10 executes the second turning control in order to prevent lane departure. More specifically, the vehicle control system 10 executes the second turning control such that the vehicle 1 moves away from the lane boundary BR and returns towards a lane center. The second target turning direction D2 of the second turning control is a direction from the lane boundary BR towards the target trajectory TP. That is, the second target turning direction D2 is the same as the above-mentioned first target turning direction D1.

In the example shown in FIG. 6, when the first turning control and the second turning control are executed simultaneously, the first turning control and the second turning control strengthen each other. In other words, the first turning control acts to strengthen the turning by the second turning control. In this case, the vehicle control system 10 maintains the target trajectory TP as it is without replanning. As a result of the first turning control and the second turning control strengthening each other, the vehicle 1 quickly returns towards the target trajectory TP. That is to say, not only response performance of the second turning control is improved but also trajectory-following performance of the first turning control is improved.

Figure 7:
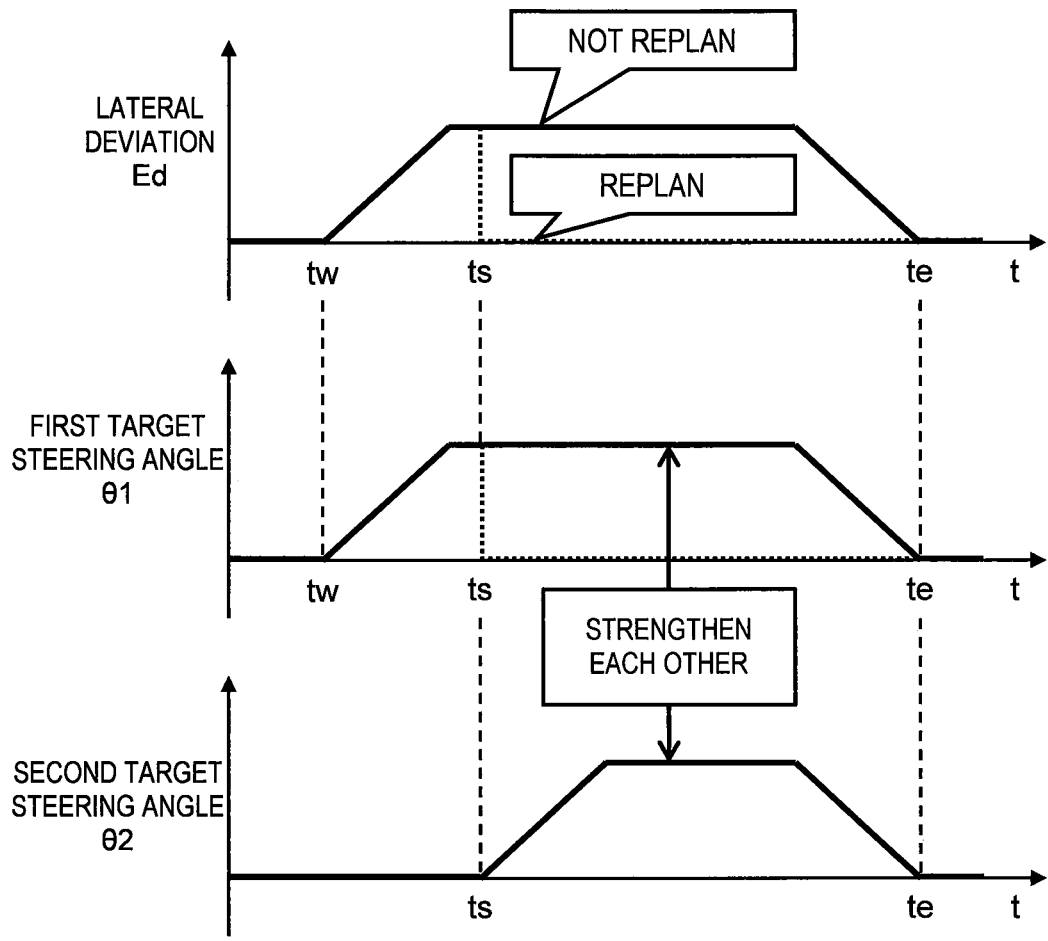
FIG. 7 is a timing chart for explaining the first turning control and the second turning control in the case of the example shown in FIG. 6.

FIG. 7 is a timing chart for explaining the first turning control and the second turning control in the case of the example shown in FIG. 6. A format of FIG. 7 is the same as that of the foregoing FIG. 5.

At a time tw, the crosswind hits the vehicle 1 and the vehicle 1 is pushed towards the lane boundary BR. As a result, the lateral deviation Ed increases, and the first target steering angle θ1 also increases accordingly.

After that, at a time ts, the second turning control is started. The first turning control and the second turning control operate simultaneously. Specifically, the first turning control and the second turning control strengthen each other. Therefore, the vehicle control system 10 maintains the target trajectory TP as it is without replanning. As a result of the first turning control and the second turning control strengthening each other, not only the response performance of the second turning control is improved but also the trajectory-following performance of the first turning control is improved.

As a comparative example, a case where the replanning processing is executed also is shown by a dotted line in FIG. 7. In the case where the replanning processing is executed, the lateral deviation Ed is reset to zero, and thus the turning by the first turning control is suppressed. Therefore, the effects of improvement of the trajectory-following performance of the first turning control and improvement of the response performance of the second turning control cannot be obtained.

Hereinafter, the vehicle control system 10 according to the present embodiment will be described in more detail.

2. Vehicle Control System

Figure 8:
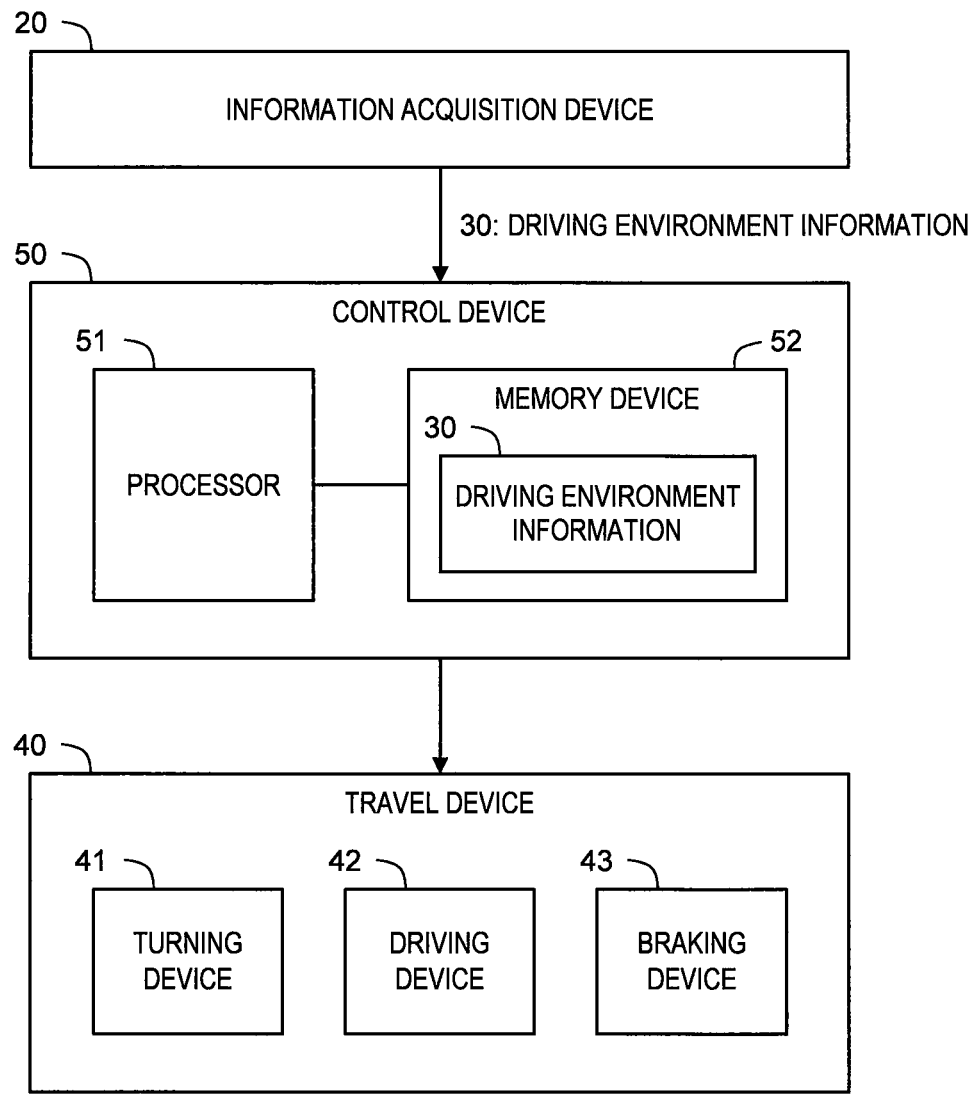
FIG. 8 is a block diagram schematically showing a configuration example of the vehicle control system according to the embodiment of the present disclosure.

FIG. 8 is a block diagram schematically showing a configuration example of the vehicle control system 10 according to the present embodiment. The vehicle control system 10 is installed on the vehicle 1 and controls the travel of the vehicle 1. The vehicle control system 10 may be an automated driving system that controls automated driving of the vehicle 1. As shown in FIG. 8, the vehicle control system 10 includes an information acquisition device 20, a travel device 40, and a control device 50.

The information acquisition device 20 acquires information necessary for the vehicle travel control by the vehicle control system 10. The information necessary for the vehicle travel control is information indicating driving environment for the vehicle 1, and is hereinafter referred to as "driving environment information 30". The information acquisition device 20 periodically acquires the driving environment information 30. A timing when the information acquisition device 20 acquires the driving environment information 30 is the sampling timing.

Figure 9:
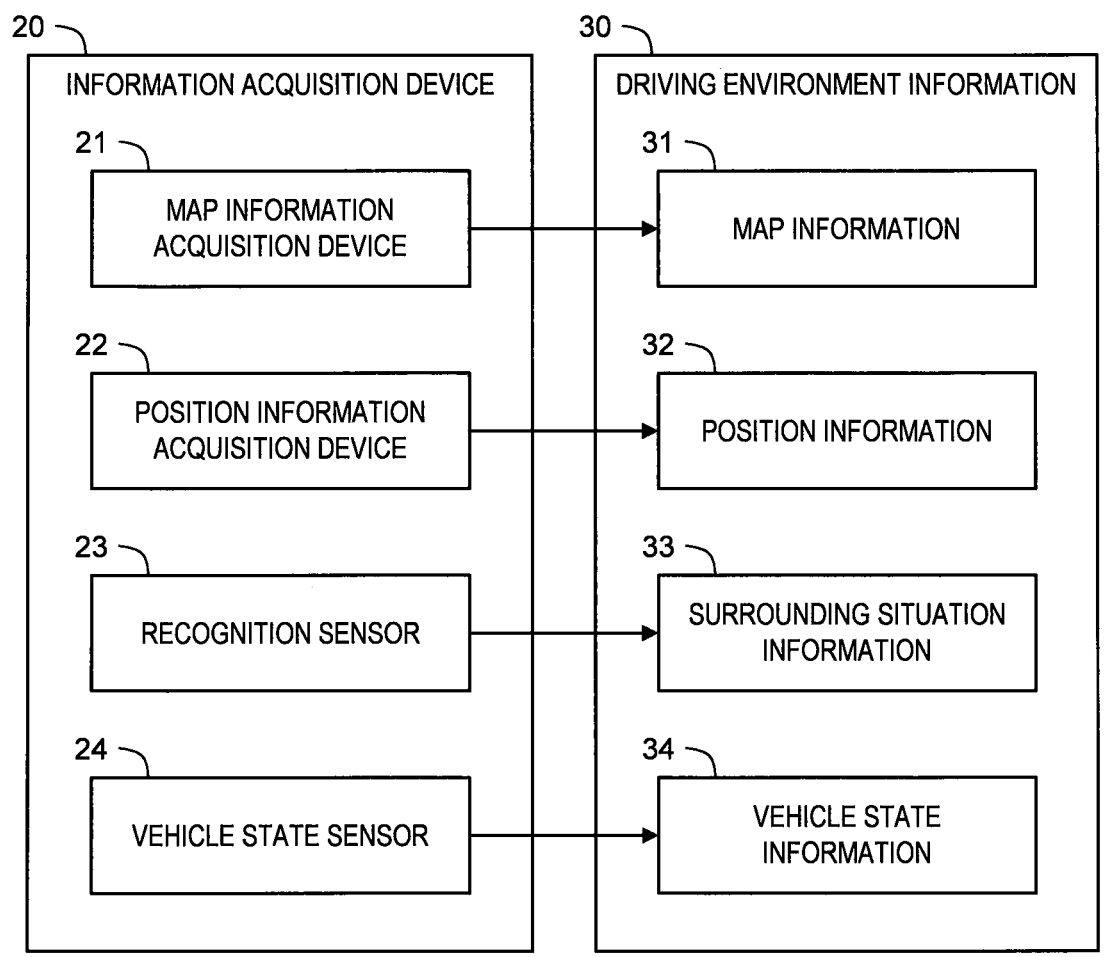
FIG. 9 is a block diagram showing an example of an information acquisition device and driving environment information in the vehicle control system according to the embodiment of the present disclosure.

FIG. 9 is a block diagram showing an example of the information acquisition device 20 and the driving environment information 30. The information acquisition device 20 includes a map information acquisition device 21, a position information acquisition device 22, a recognition sensor 23, and a vehicle state sensor 24. The driving environment information 30 includes map information 31, position information 32, surrounding situation information 33, and vehicle state information 34.

The map information acquisition device 21 acquires the map information 31 that indicates a lane configuration, a lane shape, and the like. For example, the map information acquisition device 21 acquires the map information 31 of a required area from a map database. The map database may be stored in a predetermined memory device mounted on the vehicle 1, or may be stored in a management server outside the vehicle 1. In the latter case, the map information acquisition device 21 acquires the necessary map information 31 from the map database of the management server through communication.

The position information acquisition device 22 acquires the position information 32 that indicates a position and an orientation (azimuth) of the vehicle 1. For example, the position information acquisition device 22 includes a GPS (Global Positioning System) device that measures the position and the orientation of the vehicle 1. The position information acquisition device 22 may further include a sensor that detects a white line around the vehicle 1. Matching a configuration of the detected white line and the lane configuration indicated by the map information 31 makes it possible to calculate the position and the orientation of the vehicle 1 with a higher degree of accuracy.

The recognition sensor 23 recognizes (detects) a situation around the vehicle 1. For example, the recognition sensor 23 includes a camera, a LIDAR (Laser Imaging Detection and Ranging), and a radar. The surrounding situation information 33 indicates a result of recognition by the recognition sensor 23. For example, the surrounding situation information 33 includes while line information on a white line recognized by the recognition sensor 23. In addition, the surrounding situation information 33 includes target information on a target recognized by the recognition sensor 23. The target is exemplified by a surrounding vehicle, an obstacle, a roadside structure, and so forth. The target information indicates a size of the target, a relative position and a relative velocity of the target with respect to the vehicle 1, and the like.

The vehicle state sensor 24 acquires the vehicle state information 34 that indicates a state of the vehicle 1. For example, the vehicle state sensor 24 includes a vehicle speed sensor, a wheel speed sensor, a yaw rate sensor, a lateral G sensor, and a steering angle sensor. The vehicle speed sensor detects a speed of the vehicle 1. The wheel speed sensor detects a wheel speed of each wheel. The yaw rate sensor detects a yaw rate of the vehicle 1. The lateral G sensor detects a lateral acceleration of the vehicle 1. The steering angle sensor detects a steering angle of the vehicle 1.

Referring to FIG. 8 again, the travel device 40 includes a turning device 41, a driving device 42, and a braking device 43. The turning device 41 turns a wheel of the vehicle 1. For example, the turning device 41 includes a power steering (EPS: Electric Power Steering) device. Controlling an operation of the power steering device makes it possible to turn the wheel of the vehicle 1. The driving device 42 is a power source that generates a driving force. The driving device 42 is exemplified by an engine and an electric motor. The braking device 43 generates a braking force.

The control device (controller) 50 is a microcomputer including a processor 51 and a memory device 52. The control device 50 is also called as an ECU (Electronic Control Unit). A control program is stored in the memory device 52. A variety of processing by the control device 50 is achieved by the processor 51 executing the control program stored in the memory device 52.

In particular, the control device 50 executes the vehicle travel control that controls the travel of the vehicle 1. The vehicle travel control includes the turning control (steering control) that controls turning of the vehicle 1 and the acceleration/deceleration control that controls acceleration/deceleration of the vehicle 1. The control device 50 can execute the turning control by controlling the turning device 41. Moreover, the control device 50 can execute the acceleration/deceleration control by controlling the driving device 42 and the braking device 43. The vehicle travel control is executed based on the driving environment information 30 acquired by the information acquisition device 20. The driving environment information 30 is stored in the memory device 52, read out from the memory device 52 and used as appropriate.

Hereinafter, the turning control by the control device 50 will be described in more detail.

3. Turning Control by Control Device

Figure 10:
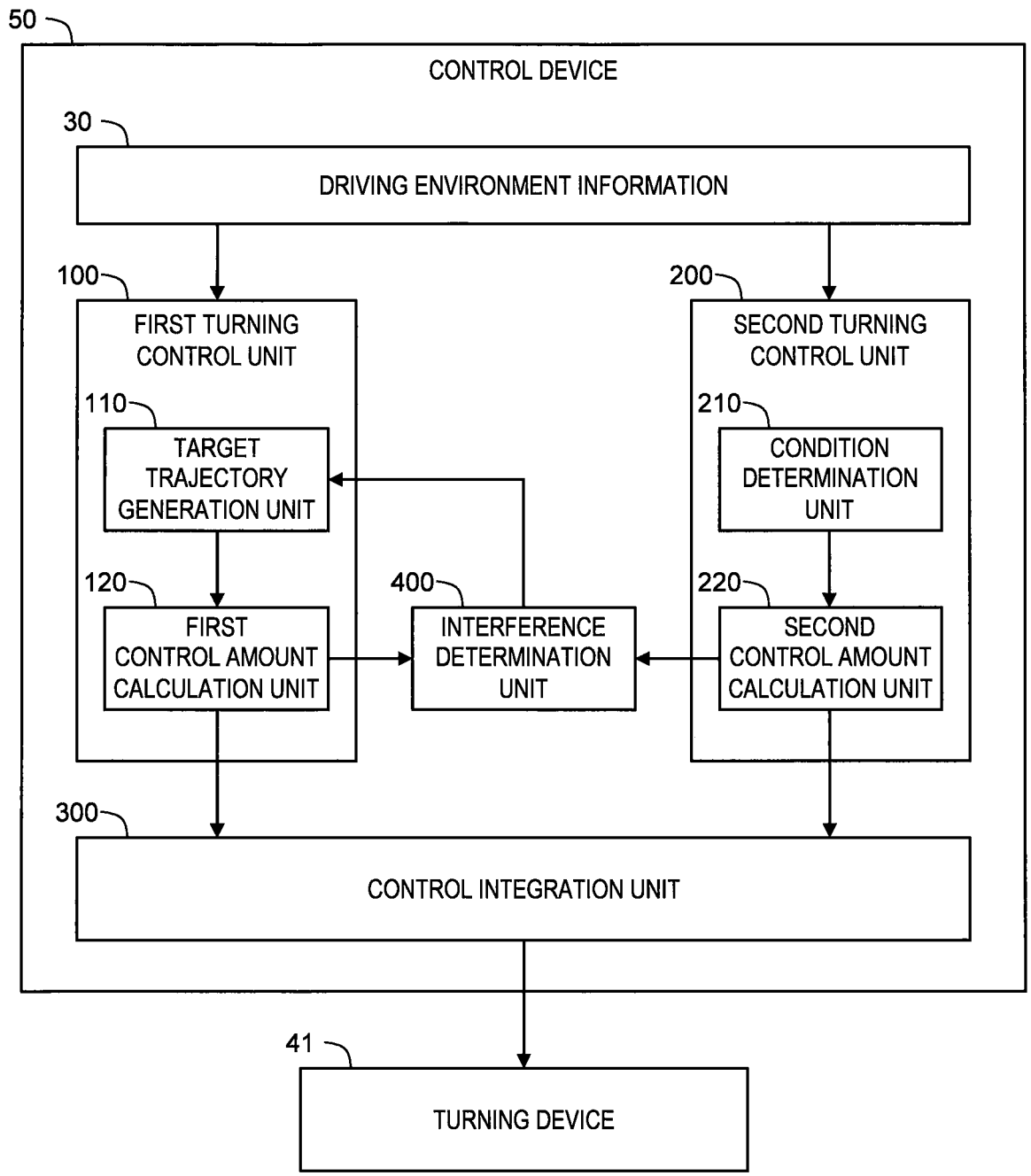
FIG. 10 is a block diagram showing an example of a functional configuration of a control device of the vehicle control system according to the embodiment of the present disclosure.

FIG. 10 is a block diagram showing an example of a functional configuration of the control device 50 of the vehicle control system 10 according to the present embodiment. The control device 50 includes a first turning control unit 100, a second turning control unit 200, a control integration unit 300, and an interference determination unit 400, as functional blocks. These functional blocks are achieved by the processor 51 of the control device 50 executing the control program stored in the memory device 52. Hereinafter, each functional block will be described in detail.

3-1. First Turning Control Unit 100

The first turning control unit 100 executes the first turning control (trajectory-following control). That is, the first turning control unit 100 generates the target trajectory TP and controls the turning of the wheel such that the vehicle 1 follows the target trajectory TP. More specifically, the first turning control unit 100 includes a target trajectory generation unit 110 and a first control amount calculation unit 120.

The target trajectory generation unit 110 generates the target trajectory TP based on the driving environment information 30 (e.g. the map information 31 and the position information 32). Various examples have been proposed as a method of calculating the target trajectory TP. A method of calculating the target trajectory TP in the present embodiment is not limited in particular.

The first control amount calculation unit 120 calculates a turning control amount required for the first turning control, based on the target trajectory TP and the driving environment information 30. The turning control amount required for the first turning control is hereinafter referred to as a "first control amount". The first control amount calculation unit 120 outputs the first control amount to the control integration unit 300.

For example, the first control amount calculation unit 120 calculates the lateral deviation Ed and the yaw angle deviation θd between the vehicle 1 and the target trajectory TP, based on the target trajectory TP and the position information 32 (i.e. the position and the orientation). Then, the first control amount calculation unit 120 calculates a target yaw rate required for making the vehicle 1 follow the target trajectory TP, based on the lateral deviation Ed, the yaw angle deviation θd, and the vehicle state information 34 (e.g. the vehicle speed and the yaw rate). Furthermore, the first control amount calculation unit 120 calculates a target steering angle (i.e. the first target steering angle θ1) according to a yaw rate deviation that is a difference between the yaw rate and the target yaw rate. Moreover, the first control amount calculation unit 120 acquires an actual steering angle from the vehicle state information 34. Then, the first control amount calculation unit 120 calculates a motor current command value according to a difference between the actual steering angle and the target steering angle. The first control amount calculation unit 120 outputs the motor current command value as the first control amount to the control integration unit 300.

3-2. Second Turning Control Unit 200

The second turning control unit 200 executes the second turning control based on the driving environment information 30. The second turning control is executed independently of the first turning control without depending on the target trajectory TP. The second turning control is exemplified by the collision avoidance control, the lane departure prevention control, and so forth. Priority of the second turning control is higher than priority of the first turning control.

The second turning control unit 200 includes a condition determination unit 210 and a second control amount calculation unit 220. The condition determination unit 210 determines whether or not an activation condition for the second turning control is satisfied, based on the driving environment information 30.

As an example, in the cased of the collision avoidance control, the condition determination unit 210 determines whether or not the vehicle 1 is likely to collide with an object, based on the surrounding situation information 33 (e.g. the target information) and the vehicle state information 34 (e.g. the vehicle speed, the steering angle, and the like). When determining that the vehicle 1 is likely to collide with the object, the condition determination unit 210 decides to execute the second turning control in order to avoid the collision.

As another example, in the case of the lane departure prevention control, the condition determination unit 210 determines whether or not the vehicle 1 is likely to deviate from a travel lane, based on the surrounding situation information 33 (e.g. the white line information) and the vehicle state information 34 (e.g. the vehicle speed, the steering angle, and the like). When determining that the vehicle 1 is likely to deviate from the travel lane, the condition determination unit 210 decides to execute the second turning control in order to prevent the lane departure.

The second control amount calculation unit 220 calculates a turning control amount required for the second turning control, based on the driving environment information 30. The turning control amount required for the second turning control is hereinafter referred to as a "second control amount". The second control amount calculation unit 220 outputs the second control amount to the control integration unit 300.

For example, the second control amount calculation unit 220 calculates a target yaw rate required for the second turning control, based on the driving environment information 30. Furthermore, the second control amount calculation unit 220 calculates a target steering angle (i.e. the second target steering angle $\theta 2$) according to a yaw rate deviation that is a difference between the yaw rate and the target yaw rate. Moreover, the second control amount calculation unit 220 acquires an actual steering angle from the vehicle state information 34. Then, the second control amount calculation unit 220 calculates a motor current command value according to a difference between the actual steering angle and the target steering angle. The second control amount calculation unit 220 outputs the motor current command value as the second control amount to the control integration unit 300.

3-3. Control Integration Unit 300

The control integration unit 300 receives the first control amount from the first turning control unit 100 and receives the second control amount from the second turning control unit 200. The control integration unit 300 integrates the first control amount and the second control amount to calculate a turning control amount. For example, the control integration unit 300 calculates the turning control amount by adding the first control amount and the second control amount. Then, the control integration unit 300 controls an operation of the turning device 41 in accordance with the turning control amount.

3-4. Interference Determination Unit 400

The interference determination unit 400 receives information on an operation status and a control parameter of the first turning control from the first turning control unit 100. The interference determination unit 400 receives information on an operation status and a control parameter of the second turning control from the second turning control unit 200. The interference determination unit 400 first determines whether or not the first turning control and the second turning control are executed simultaneously.

When the first turning control and the second turning control are executed simultaneously, the interference determination unit 400 determines whether or not the first turning control counteracts the turning by the second turning control. For example, the interference determination unit 400 compares the first target turning direction D1 of the first turning control and the second target turning direction D2 of the second turning control. The first target turning direction D1 is known from the first target steering angle $\theta 1$ calculated by the first turning control unit 100. The second target turning direction D2 is known from the second target steering angle $\theta 2$ calculated by the second turning control unit 200. When the first target turning direction D1 and the second target turning direction D2 are opposite to each other, the interference determination unit 400 determines that the first turning control counteracts the turning by the second turning control.

When determining that the first turning control counteracts the turning by the second turning control, the interference determination unit 400 instructs the target trajectory generation unit 110 to execute the replanning processing. The target trajectory generation unit 110 replans the target trajectory TP by designating at least one of the current position and the current yaw angle (azimuth, orientation) of the vehicle 1 as the starting point of the target trajectory TP. The first turning control unit 100 continues the first turning control based on the post-replanning target trajectory TP.

On the other hand, when determining that the first turning control strengthens the turning by the second turning control, the interference determination unit 400 does not instruct execution of the replanning processing. The target trajectory TP is maintained as it is.

3-5. Process Flow

Figure 11:
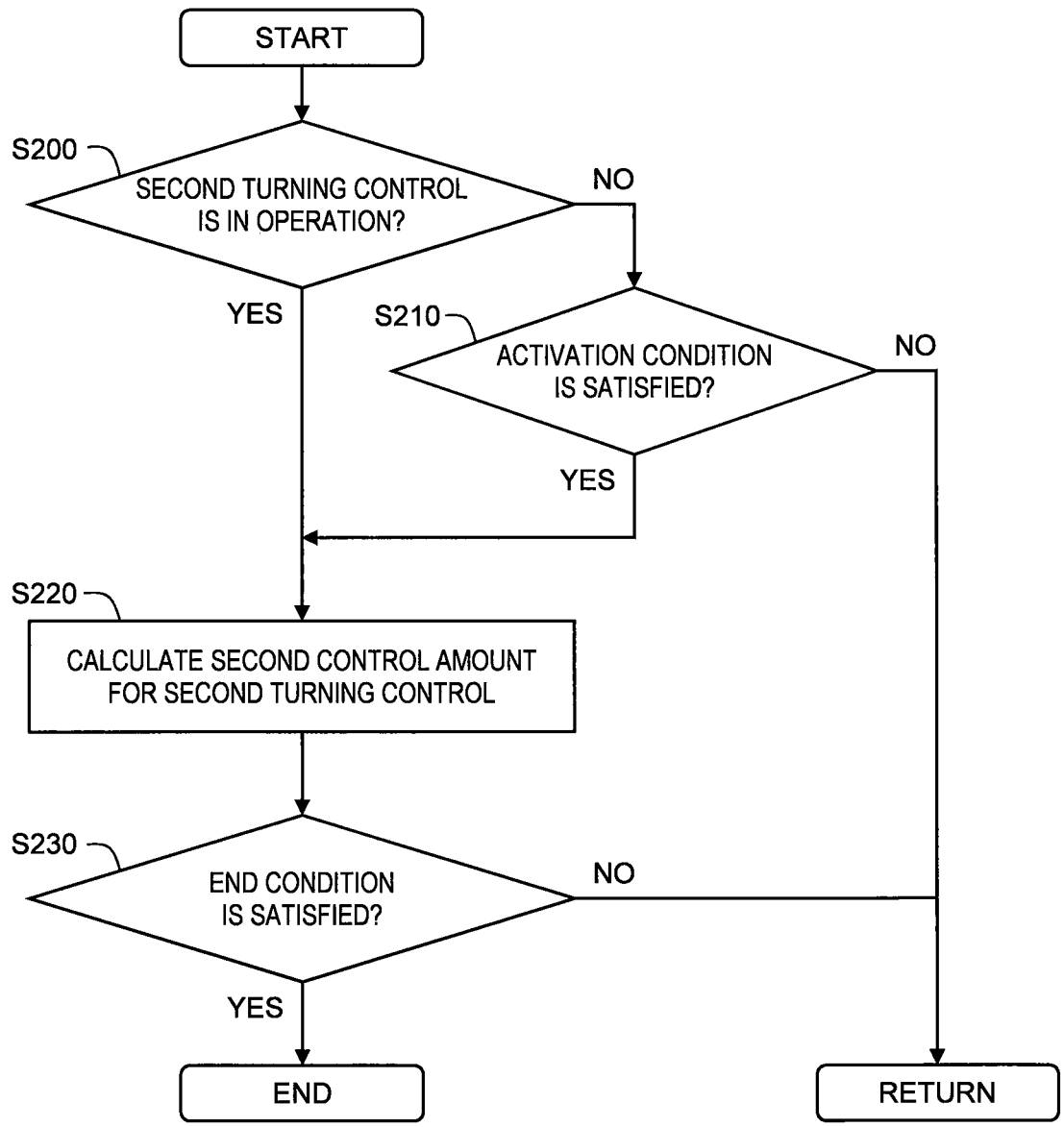
FIG. 11 is a flow chart showing the turning control by the control device of the vehicle control system according to the embodiment of the present disclosure.
Figure 12:
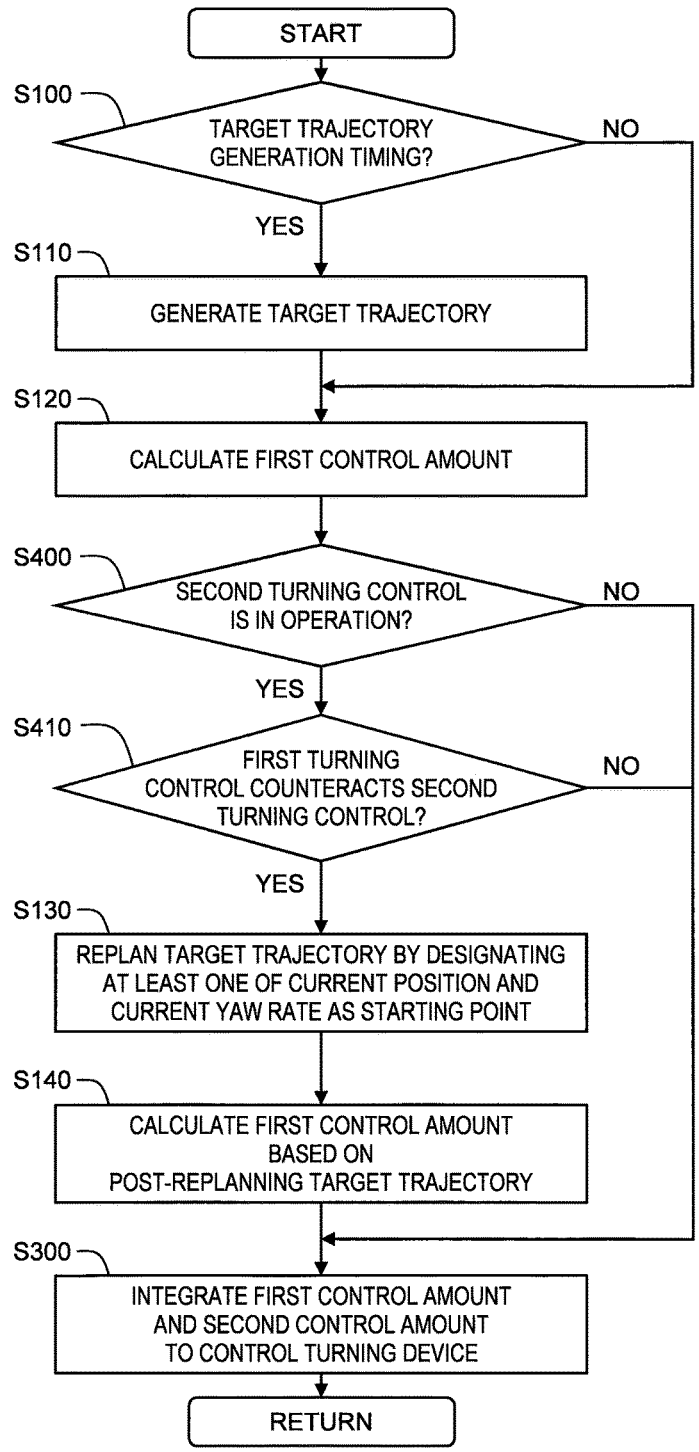
FIG. 12 is a flow chart showing the turning control by the control device of the vehicle control system according to the embodiment of the present disclosure.

FIGS. 11 and 12 are flow charts showing the turning control by the control device 50 of the vehicle control system 10 according to the present embodiment. For example, the flows shown in FIGS. 11 and 12 are executed for each sampling timing that acquires the driving environment information 30.

FIG. 11 shows a flow of processing by the second turning control unit 200.

In Step S200, the second turning control unit 200 determines whether or not the second turning control is in operation. When the second turning control is in operation (Step S200; Yes), the processing proceeds to Step S220. On the other hand, when the second turning control is not in operation (Step S200; No), the processing proceeds to Step S210.

In Step S210, the second turning control unit 200 determines whether or not the activation condition for the second turning control is satisfied. When the activation condition is satisfied (Step S210; Yes), the processing proceeds to Step S220. On the other hand, when the activation condition is not satisfied (Step S210; No), the processing in the current cycle ends.

In Step S220, the second turning control unit 200 calculates the second control amount required for the second turning control. Then, the second turning control unit 200 outputs the second control amount to the control integration unit 300.

In Step S230, the second turning control unit 200 determines whether or not an end condition for the second turning control is satisfied. When the end condition is satisfied (Step S230; Yes), the second turning control unit 200 terminates the second turning control. On the other hand, when the end condition is not satisfied (Step S230; No), the processing in the current cycle ends.

FIG. 12 shows a flow of processing by the first turning control unit 100, the control integration unit 300, and the interference determination unit 400.

In Step S100, the first turning control unit 100 determines whether or not it is a timing to generate the target trajectory TP. For example, the target trajectory TP is periodically generated every predetermined period. When it is a timing to generate the target trajectory TP (Step S100; Yes), the processing proceeds to Step S110. Otherwise (Step S100; No), the processing proceeds to Step S120.

In Step S110, the first turning control unit 100 generates a new target trajectory TP. After that, the processing proceeds to Step S120.

In Step 120, the first turning control unit 100 calculates the first control amount required for the first turning control. After that, the processing proceeds to Step S400.

In Step S400, the interference determination unit 400 determines whether or not the second turning control (see FIG. 11) is in operation. In other words, the interference determination unit 400 determines whether or not the first turning control and the second turning control are executed simultaneously. When the second turning control is in operation (Step S400; Yes), the processing proceeds to Step S410. Otherwise (Step S400; No), the processing proceeds to Step S300.

In Step S410, the interference determination unit 400 determines whether or not the first turning control counteracts the turning by the second turning control. When the first turning control counteracts the turning by the second turning control (Step S410; Yes), the processing proceeds to Step S130. On the other hand, when the first turning control strengthens the turning by the second turning control (Step S410; No), the processing proceeds to Step S300.

In Step S130, the first turning control unit 100 replans the target trajectory TP by designating at least one of the current position and the current yaw angle of the vehicle 1 as the starting point of the target trajectory TP. After that, the processing proceeds to Step S140.

In Step S140, the first turning control unit 100 calculates the first control amount required for the first turning control, based on the post-replanning target trajectory TP. After that, the processing proceeds to Step S300.

In Step S300, the control integration unit 300 integrates the first control amount and the second control amount to calculate the turning control amount. Then, the control integration unit 300 controls the operation of the turning device 41 in accordance with the turning control amount.

What is claimed is:

1. A vehicle control system installed on a vehicle and comprising:
    a turning device configured to turn a wheel of the vehicle; and
    a control device configured to execute turning control that controls the turning device, wherein
    the turning control comprises:
        first turning control that generates a target trajectory and makes the vehicle follow the target trajectory; and
        second turning control that is executed independently of the first turning control without depending on the target trajectory,
    when the first turning control and the second turning control are executed simultaneously, the control device determines whether or not the first turning control counteracts turning of the wheel by the second turning control, and
    when determining that the first turning control counteracts the turning of the wheel by the second turning control, the control device replans the target trajectory by designating at least one of a current position and a current yaw angle of the vehicle as a starting point of the target trajectory.

2. The vehicle control system according to claim 1, wherein
    when determining that the first turning control strengthens the turning of the wheel by the second turning control, the control device maintains the target trajectory without replanning.

3. The vehicle control system according to claim 1, wherein
    the control device compares a first target turning direction of the first turning control and a second target turning direction of the second turning control, and
    when the first target turning direction is opposite to the second target turning direction, the control device determines that the first turning control counteracts the turning of the wheel by the second turning control.

4. The vehicle control system according to claim 1, wherein
    priority of the second turning control is higher than priority of the first turning control.

* * * * *